(12) United States Patent
Jiang et al.

(10) Patent No.: US 12,671,543 B2
(45) Date of Patent: Jun. 30, 2026

(54) METHOD AND DEVICE FOR SOUNDING REFERENCE SIGNAL INDICATION ENHANCEMENT

(71) Applicant: ZTE CORPORATION, Shenzhen (CN)

(72) Inventors: Chuangxin Jiang, Shenzhen (CN); Hao Wu, Shenzhen (CN); Zhaohua Lu, Shenzhen (CN); Yuxin Wang, Shenzhen (CN); Shujuan Zhang, Shenzhen (CN); Bo Gao, Shenzhen (CN); Yu Pan, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 587 days.

(21) Appl. No.: 17/869,983

(22) Filed: Jul. 21, 2022

(65) Prior Publication Data

US 2022/0360405 A1     Nov. 10, 2022

Related U.S. Application Data

(63) Continuation of application No. PCT/CN2020/118648, filed on Sep. 29, 2020.

(51) Int. Cl.
*H04L 5/00* (2006.01)
*H04W 72/23* (2023.01)
*H04W 72/566* (2023.01)

(52) U.S. Cl.
CPC ........... *H04L 5/0051* (2013.01); *H04W 72/23* (2023.01); *H04W 72/569* (2023.01)

(58) Field of Classification Search
None
See application file for complete search history.

(56) References Cited

U.S. PATENT DOCUMENTS 9,258,092 B2 *   2/2016   Heo ..................... H04W 52/367
11,159,289 B2 *  10/2021  Rico Alvarino .. H04W 72/0446
(Continued)

FOREIGN PATENT DOCUMENTS

CN        109391447 A       2/2019
WO     WO-2019/147644 A1    8/2019
(Continued)

OTHER PUBLICATIONS

CATT, "Discussion on enhancements on SRS flexibility, coverage and capacity" 3GPP TSG RAN WG1 #102-e, R1-2005688, Aug. 17, 2020, e-Meeting (6 pages).
(Continued)

*Primary Examiner* — Saumit Shah
(74) *Attorney, Agent, or Firm* — Foley & Lardner LLP

(57)          ABSTRACT

Presented are systems and methods for sounding reference signal (SRS) indication enhancement. A wireless communication device may determine to perform a first sounding reference signal (SRS) transmission in a first component carrier (CC). The wireless communication device may determine to perform the first SRS in an available time unit according to a time offset and a second SRS transmission in a second CC. A wireless communication device may receive one or more lists of carrier indicator (CIF) values for SRS transmissions from a wireless communication node. The wireless communication device may determine a first SRS transmission according to the one or more lists of CIF values. The wireless communication device may determine a first SRS transmission according to a value of a CIF field in a downlink control information (DCI).

20 Claims, 12 Drawing Sheets

1150

(56)  References Cited

U.S. PATENT DOCUMENTS

| | | | | |
|---|---|---|---|---|
| 2012/0182957 | A1 | 7/2012 | Noh et al. | |
| 2016/0088614 | A1* | 3/2016 | Noh | H04L 5/001 |
| | | | | 370/329 |
| 2017/0086189 | A1* | 3/2017 | Ouchi | H04W 52/325 |
| 2019/0044678 | A1 | 2/2019 | Liu et al. | |
| 2019/0229859 | A1* | 7/2019 | Manolakos | H04W 56/00 |
| 2019/0356431 | A1 | 11/2019 | Manolakos et al. | |
| 2019/0380134 | A1* | 12/2019 | Liu | H04W 72/0453 |
| 2020/0403749 | A1* | 12/2020 | Park | H04L 5/0048 |
| 2021/0359882 | A1* | 11/2021 | Liu | H04L 5/0051 |
| 2022/0140975 | A1* | 5/2022 | Siomina | H04L 5/0051 |
| | | | | 370/329 |
| 2022/0209916 | A1* | 6/2022 | Krishnamoorthy | H04L 27/261 |
| 2023/0208578 | A1* | 6/2023 | Liu | H04L 5/0048 |
| | | | | 370/330 |

FOREIGN PATENT DOCUMENTS

| | | | |
|---|---|---|---|
| WO | WO-2019/190236 A1 | 10/2019 | |
| WO | WO-2021/216706 A1 | 10/2021 | |

OTHER PUBLICATIONS

Ericsson, "Srs Performance and Potential Enhancements" 3GPP TSG-RAN WG1 Meeting #102-e, R1-2006610, Aug. 17, 2020, e-Meeting (16 pages).

Huawei et al., "Enhancements on SRS for Rel-17" 3GPP TSG RAN WG1 Meeting #102-e, R1-2005247, Aug. 17, 2020, e-Meeting (9 pages).

Intel Corporation, "Discussion on SRS enhancements" 3GPP TSG RAN WG1 Meeting #102-e, R1-2005863, Aug. 17, 2020, e-Meeting (13 pages).

International Search Report and Written Opinion for PCT Appl. No. PCT/CN2020/0118648, mailed Jun. 30, 2021 (9 pages).

Lenovo et al., "Enhancements on Multi-beam Operation" 3GPP TSG RAN WG1#102-e, R1-2005820, Aug. 17, 2020, e-Meeting (6 pages).

Lenovo et al., "Enhancements on SRS" 3GPP TSG RAN WG1#102-e, R1-2005824, Aug. 17, 2020, e-Meeting (3 pages).

LG Electronics, "Enhancements on SRS flexibility, coverage and capacity" 3GPP TSG RAN WG1 #102-e, R1-2006601, Aug. 17, 2020, e-Meeting (5 pages).

Moderator (ZTE), "FL summary #2 on SRS enhancements" 3GPP TSG RAN WG1 Meeting #102-e, R1-2007173, Aug. 17, 2020, eMeeting (39 pages).

Moderator (ZTE), "Fl summary #3 on SRS enhancements" 3GPP TSG RAN WG1 Meeting #102-e, R1-2007234, Aug. 17, 2020, eMeeting (26 pages).

Motorola: "On remaining details of dynamic aperiodic SRS triggering" 3GPP TSG RAN WG1 Meeting #63; R1-106291; Nov. 19, 2010; Jacksonville, USA (5 pages).

NTT Docomo, Inc., "Discussion on multi-beam operation" 3GPP TSG RAN WG1 #102-e, R1-2006717, Aug. 17, 2020, e-Meeting (14 pages).

NTT Docomo, Inc., "Discussion on multi-beam operation" 3GPP TSG RAN WG1 #102-e, R1-2006951, Aug. 17, 2020, e-Meeting (14 pages).

Oppo, "Enhancements on SRS flexibility, coverage and capacity" 3GPP TSG RAN WG1 #102-e, R1-2005988, Aug. 17, 2020, e-Meeting (4 pages).

Qualcomm Incorporated, "Enhancements on SRS flexibility, switching, coverage and capacity" 3GPP TSG-RAN WG1 Meeting #102-e, R1-2006795, Aug. 17, 2020, e-Meeting (27 pages).

Samsung, "Enhancements on SRS" 3GPP TSG RAN WG1 #102-e, R1-2006133, Aug. 17, 2020, e-Meeting (5 pages).

Samsung, "On Rel.17 FeMIMO WI" 3GPP TSG RAN WG1 #101, R1-2003918, May 25, 2020, e-Meeting (12 pages).

Sony, "Considerations on SRS flexibility, coverage and capacity" 3GPP TSG RAN WG1 Meeting #102-e, R1-2005565, Aug. 17, 2020, e-Meeting (5 pages).

Xiaomi, "Enhancements on multi-beam operation" 3GPP TSG RAN WG1 #102-e, R1-2006540, Aug. 17, 2020, e-Meeting (5 pages).

First Office Action for CN Appl. No. 202080105231.2, dated Jul. 25, 2024 (with English translation, 10 pages).

Extended European Search Report for EP Appl. No. 20955486.4, dated Oct. 10, 2023 (11 pages).

Nokia, et al., "Corrections of NR positioning support", 3GPP Draft, RP-200694, vol. RAN WG1, No. e-Meeting, May 25, 2020-Jun. 5, 2020 Jun. 23, 2020 (Jun. 23, 2020), XP052336526.

Communication pursuant to Article 94(3) EPC for EP Appl. No. 20955486.4, dated Jan. 21, 2026 (8 pages).

* cited by examiner

300

| slot offset 302 | slot0 304 | slot1 306 | slot2 308 | slot3 310 | slot4 312 |
|---|---|---|---|---|---|
| | D | D | D | S | U |
| 0 | | | | PDCCH SRS | |
| 1 | | | PDCCH 314 | SRS 316 | |
| 1 | | | | PDCCH 314 | SRS 316 |
| 2 | | PDCCH 314 | | SRS 316 | |
| 2 | | | PDCCH 314 | | SRS 316 |
| 3 | PDCCH 314 | | | SRS 316 | |
| 3 | PDCCH 314 | PDCCH 314 | | | SRS 316 |
| 4 | PDCCH 314 | | | | SRS 316 |

| slot offset | slot0 | slot1 | slot2 | slot3 | slot4 |
|---|---|---|---|---|---|
| | D | D | D | S | U |
| 0 | PDCCH 414 | | | SRS 416 | |
| 0 | | PDCCH 414 | | SRS 416 | |
| 0 | | | PDCCH 414 | SRS 416 | |
| 0 | | | | PDCCH  SRS | |

FIG. 4

| CIF | CC index |
|---|---|
| 0 | CC#i |
| 1 | CC#j1 |
| 2 | CC#j2 |
| 3 | CC#j3 |
| 4 | CC#j4 |
| 5 | CC#j5 |
| 6 | CC#j6 |
| 7 | CC#j7 |

| CIF | CC index for PUSCH/PDSCH | CC group for SRS |
|---|---|---|
| 0 | CC#i | CC#i, CC#j2 |
| 1 | CC#j1 | CC#j1, CC#j3, CC#j5 |
| 2 | CC#j2 | CC#j2 |
| 3 | CC#j3 | CC#j3, CC#j2 |
| 4 | CC#j4 | CC#j4, CC#j6, CC#j7 |
| 5 | CC#j5 | CC#j5, CC#j3 |
| 6 | CC#j6 | CC#j6 |
| 7 | CC#j7 | CC#j7 |

| Carriers | SRS resource set | CIF values |
|----------|------------------|------------|
| CC#j1    | 0                | 1, 2, 3    |
|          | 1                | 1, 3, 5    |
|          | 2                | 1          |
| CC#j2    | 0                | 2, 3       |
|          | 1                | 2, 4       |
| ⋮        | ⋮                | ⋮          |

Receive one or more lists of CIF values

1254

Determine a first SRS transmission

1250

METHOD AND DEVICE FOR SOUNDING REFERENCE SIGNAL INDICATION ENHANCEMENT

CROSS-REFERENCE TO RELATED APPLICATION

This application claims the benefit of priority under 35 U.S.C. § 120 as a continuation of PCT Patent Application No. PCT/CN2020/118648, filed on Sep. 29, 2020, the disclosure of which is incorporated herein by reference in its entirety.

TECHNICAL FIELD

The disclosure relates generally to wireless communications, including but not limited to systems and methods for sounding reference signal (SRS) indication enhancement.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may determine to perform a first sounding reference signal (SRS) transmission in a first component carrier (CC). The wireless communication device may determine to perform the first SRS in an available time unit according to a time offset and a second SRS transmission in a second CC.

In some embodiments, the second SRS transmission may have a higher priority than the first SRS transmission. In some embodiments, the wireless communication device may be incapable of simultaneously supporting the first SRS transmission and the second SRS transmission. In some embodiments, the second SRS transmission may be of semi-persistent or periodic type. In some embodiments, the wireless communication device may identify a priority rule. In some embodiments, the priority rule may be predetermined or configured via a higher layer signaling. In some embodiments, the priority rule may be predetermined or configured to prioritize a plurality of SRS transmissions in at least the first CC and the second CC.

In some embodiments, the priority rule may operate according to a CC index of at least one of the first CC or the second CC. In some embodiments, the higher layer signaling may comprise radio resource control (RRC) signaling or medium access control (MAC) layer signaling. In some embodiments, the available time unit may exclude an instance where the second SRS transmission overlaps with the first SRS transmission in a same symbol.

In some embodiments, the wireless communication device may determine to perform the first SRS transmission in a next available time unit if the first SRS transmission would overlap in time with the second SRS transmission if performed in the available time unit. In some embodiments, the wireless communication device may determine to drop or bypass the first SRS transmission, if the first SRS transmission would overlap in time with the second SRS transmission if performed in the available time unit. In some embodiments, the wireless communication device may be incapable of simultaneously supporting the first SRS transmission and the second SRS transmission. In some embodiments, the wireless communication device may be incapable of simultaneously supporting two beams for the first SRS transmission and the second SRS transmission respectively.

At least one aspect is directed to a system, method, apparatus, or a computer-readable medium. A wireless communication device may receive one or more lists of carrier indicator (CIF) values for SRS transmissions from a wireless communication node. The wireless communication device may determine a first SRS transmission according to the one or more lists of CIF values. The wireless communication device may determine a first SRS transmission according to a value of a CIF field in a downlink control information (DCI).

In some embodiments, each of the one or more lists of CIF values may be configured corresponding to a respective SRS resource or resource set. In some embodiments, each of the one or more lists of CIF values may be configured corresponding to a respective SRS configuration (SRS-Config). In some embodiments, the wireless communication device may transmit using a first SRS resource or resource set for the first SRS transmission. In some embodiment, the wireless communication device may transmit when a CIF value indicated by the DCI matches with one of the one or more lists of CIF values. In some embodiments, the one or more lists of CIF values may include a first list of CIF values used for SRS transmissions for a positioning purpose. In some embodiments, the one or more lists of CIF values may include a second list of CIF values used for SRS transmissions for a non-positioning purpose.

At least one aspect is directed to a system, method, apparatus, or a computer-readable medium. A wireless communication node may send one or more lists of carrier indicator (CIF) values for SRS transmissions to a wireless communication device. The wireless communication node may cause the wireless communication device to determine a first SRS transmission according to the one or more lists of CIF values. The wireless communication node may cause the wireless communication device to determine a first SRS transmission according to a value of a CIF field in a downlink control information (DCI).

In some embodiments, each of the one or more lists of CIF values may be configured corresponding to a respective SRS resource or resource set. In some embodiments, each of the one or more lists of CIF values may be configured corresponding to a respective SRS configuration (SRS-Config). In some embodiments, the wireless communication device may transmit using a first SRS resource or resource set for the first SRS transmission. In some embodiment, the wireless communication device may transmit when a CIF value indicated by the DCI matches with one of the one or more lists of CIF values. In some embodiments, the one or more lists of CIF values may include a first list of CIF values used for SRS transmissions for a positioning purpose. In some embodiments, the one or more lists of CIF values may include a second list of CIF values used for SRS transmissions for a non-positioning purpose.

In some embodiments, a first SRS transmission (e.g., SRS transmission A) in a CC (e.g., CC #i) can be scheduled in an available slot based on an informed/configured slot offset value. The available slot may exclude a second SRS transmission (e.g., SRS transmission B) in another CC (e.g., CC #j). In some embodiments, the second SRS transmission may overlap/coincide/collide with the first SRS transmission (e.g., SRS transmission A) in the time domain. The values associated with the CCs (e.g., value i and/or value j) may be non-negative integers. In some embodiments, the second SRS transmission (e.g., SRS transmission B) may have a higher priority than the first SRS transmission (e.g., SRS transmission A). The wireless communication device (e.g., a UE) may be unable to support simultaneous transmissions of at least two SRS transmissions (e.g., SRS transmission A and SRS transmission B). In some embodiments, RRC signaling (or other types of signaling) may be used to configure at least one priority rule. In some embodiments, the priority rule(s) may be predetermined/predefined (e.g., based on the value of the CC index).

In some embodiments, the wireless communication node (e.g., gNB) may configure one or more lists of CIF values for SRS transmissions. The configured list(s) of CIF values and/or the value of the CIF field of a DCI may indicate/specify at least one SRS transmission. In some embodiments, one or more lists of CIF values may be configured for each SRS resource, SRS resource set, and/or SRS configuration (e.g., SRS-Config). In some embodiments, the CIF value indicated by the DCI may correspond to at least one CIF value of the configured list of CIF values for a first SRS resource set. Therefore, the first SRS resource set may be triggered by the CIF value of the DCI.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3 illustrates a table of an example time division duplexing (TDD) slot configuration, in accordance with some embodiments of the present disclosure;

FIG. 4 illustrates example approaches for redefining the value of the slot offset, in accordance with some embodiments of the present disclosure;

FIG. 8 illustrates example approaches for mapping at least one carrier indicator (CIF) value with one or more component carriers, in accordance with some embodiments of the present disclosure;

FIG. 9 illustrates example approaches for mapping at least one CIF value with one or more component carrier (CC) groups, in accordance with some embodiments of the present disclosure;

FIG. 10 illustrates example approaches for configuring at least one CIF value for a SRS resource and/or SRS resource set, in accordance with some embodiments of the present disclosure.

DETAILED DESCRIPTION

Figure 1:
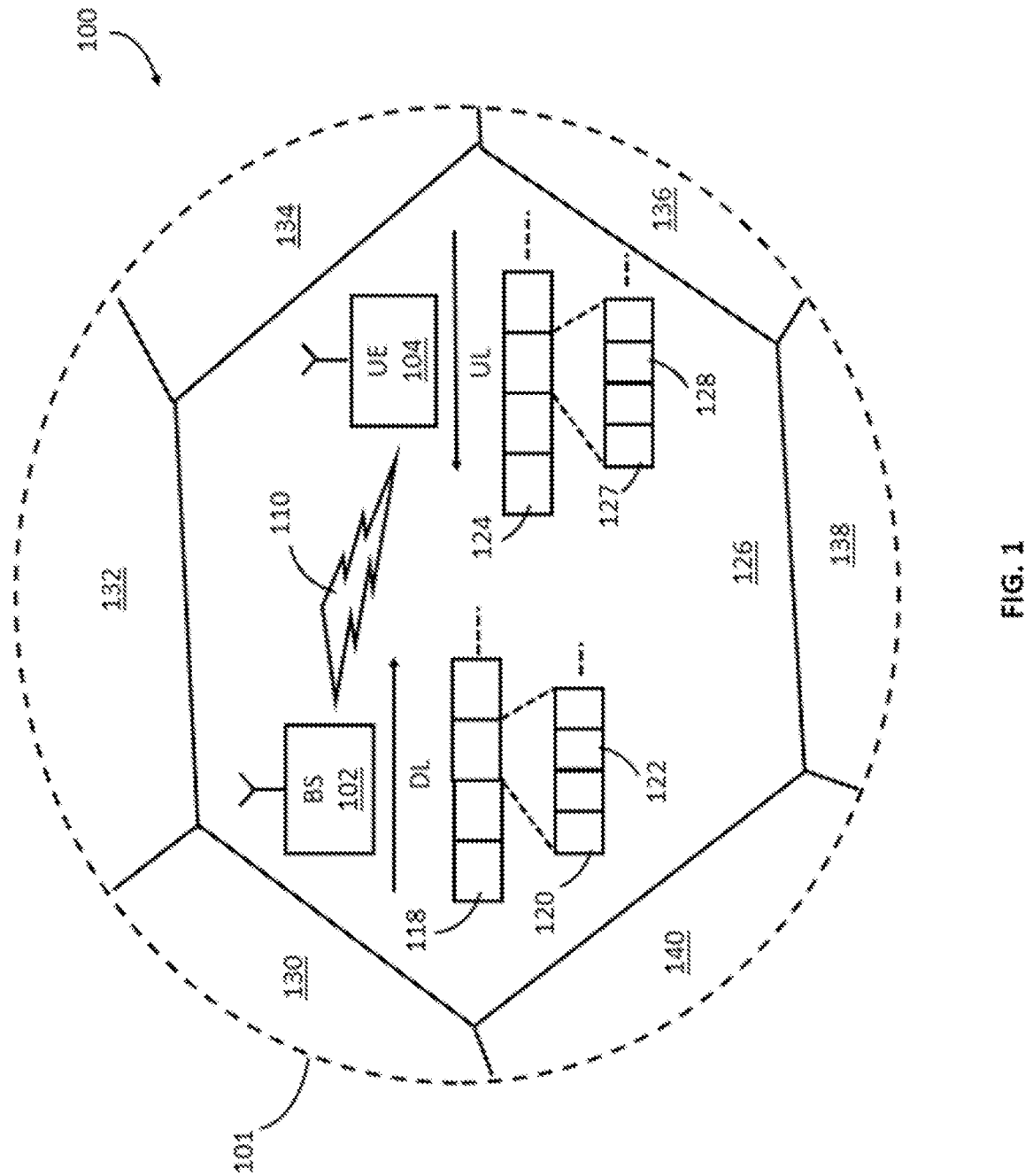
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| 5G-GUTI 5G- | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CM | Connected Mode |
| CMR | Channel Measurement Resource |
| CSI | Channel State Information |
| CQI | Channel Quality Indicator |

-continued

| Acronym | Full Name |
| --- | --- |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | New radio |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RBG | Resource Block Group |
| RRC | Radio Resource Control |
| RV | Redundant Version |
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
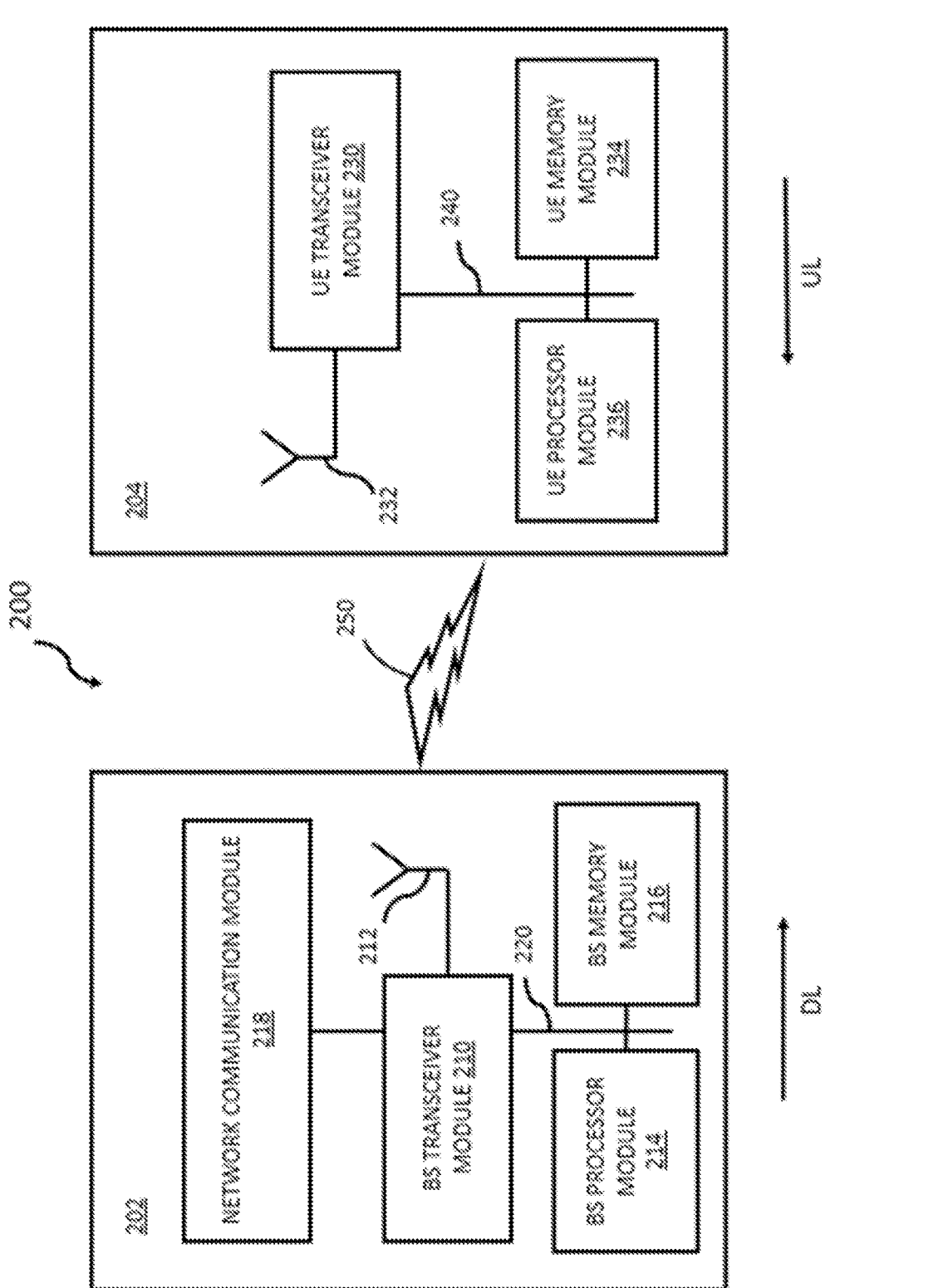
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD- ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Sounding Reference Signal (SRS) Indication Enhancement In certain specifications (e.g., 3GPP specification and/or other specifications), downlink control information (DCI) can be used to schedule sounding reference signal (SRS) transmissions in one carrier. Therefore, the current level of flexibility for scheduling SRS transmissions may be insufficient/inadequate. The systems and methods presented herein include a novel approach for improving/enhancing SRS flexibility by at least 25% (e.g., 35, 45 or other percent) for example, without introducing/increasing DCI overhead. For example, the systems and methods may include one or more approaches that use at least one carrier indicator field (CIF) value list. In some embodiments, at least one CIF value list may be configured for each SRS resource set.

In certain systems (e.g., long term evolution (LTE), new radio (NR) and/or other systems), the SRS may be a common feature. In a wireless communication system, the SRS may be utilized for uplink (UL) and/or downlink (DL) channel measurement. For example, the SRS (and/or other signaling) may be used to acquire/obtain one or more UL channel state measurements and/or other measurements. In certain systems with DL and UL slots in a same frequency band (e.g., time division duplexing (TDD) systems and/or other systems), the SRS can be utilized to acquire one or more DL channel state information (CSI) measurements and/or other measurements.

In some embodiments, the SRS can be transmitted/broadcast/sent according to one or more time domain types, such as a periodic SRS, a semi-persistent SRS, an aperiodic SRS, and/or other types. The time domain type may be configured and/or determined for a SRS resource set, the SRS resource set comprising one or more SRS resources. The SRS resource(s) may comprise one or more frequency-domain and/or time domain resources allocated for the SRS (e.g., a location in the time domain, a location in the frequency-domain, and/or other resources). Radio resource control (RRC) signaling and/or other types of signaling may be used to configure periodic SRS transmissions. In some embodiments, medium access control element (MAC-CE) signaling (or other types of signaling) may be used to configure/trigger semi-persistent SRS transmissions. One or more SRS configurations may be configured via RRC signaling and/or other types of signaling. The one or more SRS configurations may include frequency resources, time domain resources (e.g., number of orthogonal frequency-division multiplexing (OFDM) symbols), periodicity, time offset (e.g., slot offset), and/or other SRS configurations. In some embodiments, the SRS configurations corresponding to aperiodic SRS transmissions may be configured by using RRC signaling, MAC-CE signaling, and/or other types of signaling. One or more aperiodic SRS transmissions can be activated/triggered/caused by downlink control information (DCI), such as a wireless communication device (e.g., UE) specific DCI and/or a common group DCI.

The aperiodic SRS may provide more flexibility compared to other SRS time domain types, such as the periodic SRS and/or the semi-persistent SRS (e.g., the aperiodic SRS can be used/triggered/caused when necessary). The parameters of the SRS may be configured/determined in each of a plurality of SRS resources and/or SRS resource sets. Therefore, each SRS resource and/or SRS resource set may link/relate/associate to one or more SRS trigger states.

A wireless communication device (e.g., a UE, a terminal, or a served node) may use a SRS request field (or other fields) of the DCI to indicate/provide/specify a value of the SRS trigger state. The value of the SRS trigger state (e.g., indicated by the DCI) may trigger one or more SRS resource sets that are linked/related/associated with the value of the SRS trigger state. For example, RRC signaling (or other types of signaling) may configure five (or other numbers of) aperiodic SRS resource sets (e.g., SRS resource set 0, SRS resource set 1, SRS resource set 2, SRS resource set 3, and SRS resource set 4). Of the five aperiodic SRS resource sets, SRS resource set 0 and/or SRS resource set 2 may be linked/related/associated with a SRS trigger state value of 1, for instance. SRS resource set 1 and/or SRS resource set 3 may correspond to a SRS trigger state value of 2 (or other values), while SRS resource set 4 may be linked to a SRS trigger state value of 3 (or other values). If the SRS request field of the DCI indicates that the value of the SRS trigger state corresponds to 1, the wireless communication node may send/transmit/broadcast SRS resource set 0 and/or SRS resource set 2. If, for instance, the SRS request field indicates that the value of the SRS trigger state corresponds to 2, the wireless communication node may broadcast SRS resource set 1 and/or SRS resource set 3. If the SRS request field specifies that the value of the SRS trigger state corresponds to 3, the wireless communication node may transmit SRS resource set 4. In another example, if the SRS request field indicates that the value of the SRS trigger state corresponds to 0 (or other values), none of the SRS resource sets (e.g., SRS resource set 0, SRS resource set 1, and/or other resource sets) may be transmitted.

In some embodiments, the SRS request field of the DCI may be specified by using at least 2 bits (or other numbers of bits) of the DCI. Therefore, although the SRS request field of the DCI can trigger the SRS resource sets (e.g., linking to a value of the SRS trigger state), higher layer signaling (e.g., RRC signaling and/or MAC-CE signaling) may configure/determine the SRS parameters of the SRS resource sets and/or the SRS parameters of the SRS resources included in the SRS resource sets. The SRS parameters (e.g., of the SRS resource sets and/or the SRS resources) may comprise a time offset (e.g., a number of time slots, a number of symbols, and/or other offsets) between a DCI (or a physical downlink control channel (PDCCH)) and a triggered SRS resource (or SRS resource set), transmissionComb, resourceMapping, freqDomainPosition, freqDomainShift, freqHopping, and/or other parameters of the SRS.

Referring now to FIG. 3, depicted is an example of a TDD slot format or configuration 300. In some embodiments, the TDD slot configuration can include five consecutive slots (e.g., slot 0, slot 1, slot 2, slot 3, and/or slot 4). Columns 304, 306, 308, 310, and 312 of the example TDD slot configuration 300 correspond to an individual slot of the five consecutive slots. Column 302 of the TDD slot format 300 specifies a value of a slot offset between a PDCCH and a SRS transmission. In this example, slot 0, slot 1, and/or slot 2 correspond to DL slots (e.g., D slots) that can support DL symbols (e.g., PDCCH and/or physical downlink shared channel (PDSCH)). Slot 3 may correspond to a special and/or flexible slot (e.g., S slot) that can support DL symbols and/or UL symbols (e.g., PDCCH, SRS, and/or other DL/UL symbols). Slot 4 may correspond to an UL slot (e.g., U slot), the UL slot supporting UL symbols (e.g., SRS and/or physical uplink shared channel (PUSCH)).

In some embodiments, RRC signaling (and/or other types signaling) may be used to configure/determine the value of the slot offset (or other time offsets). If the configured value of the slot offset corresponds to 0, the same slot (e.g., slot 3 and/or other slots that support DL and UL symbols) may be used to transmit/send/broadcast a PDCCH 314 (or other DL channels/symbols) and a triggered SRS 316 (e.g., SRS resource and/or SRS resource set). In the example TDD slot format 300, the PDCCH 314 and/or the SRS 316 can be transmitted in or by using slot 3 (e.g., the S slot). Unless the RRC signaling reconfigures the slot offset value (e.g., from 0 to another value), slot 4 (or other UL slots) may not be available to transmit the SRS 316 and the PDCCH 314.

In another example, if the configured value of the slot offset corresponds to 1, slot 2 and/or slot 3 (or other slots that support DL symbols) can be used to transmit the PDCCH

US 12,671,543 B2

11

314. If the PDCCH 314 is transmitted by using slot 2, slot 3 may be utilized to send the SRS 316. If instead the PDCCH 314 uses slot 3, the SRS 316 can be transmitted by using slot 4. The wireless communication device may be unable to trigger the SRS 316 transmission by using slot 0 and/or slot 1 to send/transmit the PDCCH 314 (e.g., the update interval of RRC signaling can be lengthy, which may cause PDCCH congestion).

In some embodiments, the configured value of the slot offset may correspond to a value of 2. If the configured value of the slot offset corresponds to 2, slot 1 and/or slot 2 (or other slots that support DL symbols) can be used to transmit the PDCCH 314. If the PDCCH 314 is transmitted by using slot 1, slot 3 may be utilized to send the SRS 316. If instead the PDCCH 314 uses slot 2, the SRS 316 can be transmitted by using slot 4. In another example, if the configured value of the slot offset corresponds to 3, slot 0 and/or slot 1 can be used to transmit the PDCCH 314. If slot 0 is used to transmit the PDCCH 314, slot 3 may be used to transmit the SRS 316. If the PDCCH 314 is transmitted by using slot 1, the SRS 316 can be transmitted by using slot 4. In some embodiments, the configured value of the slot offset may correspond to a value of 4. If the configured value of the slot offset has a value of 4, slot 0 and slot 4 can be used to transmit the PDCCH 314 and the SRS 316 respectively.

A. Embodiment 1

Referring now to FIG. 4, depicted is an example approach 400 for redefining the value of the slot offset. In some embodiments, SRS flexibility can be enhanced by establishing a novel/new/different definition/interpretation of the value of the slot offset (sometimes referred as time offset). For example, the value of the slot offset can be interpreted/defined to indicate the slot offset between a PDCCH 414 transmission (or other DL channels/transmissions) and the $k^{th}$ or (k+1)th slot available for SRS 416 transmission. If the value of the slot offset is configured (e.g., via RRC signaling) to a value of 0, the configured slot offset can be interpreted as indicating that the first available/allowable slot, starting at/from the slot of the PDCCH 414 transmission, can be used to transmit the SRS 416. For instance, if the PDCCH 414 is transmitted by using a DL slot (e.g., slot 0, slot 1, and/or slot 2), the first available slot may correspond to slot 3. Therefore, slot 3 may transmit the SRS 416. An available slot may indicate a slot in which one or more SRS symbols of a SRS resource and/or SRS resource set can be sent/transmitted in a BWP or CC. In some embodiments, an available slot may indicate a slot in which all SRS symbols of a SRS resource or all SRS symbols of all SRS resources within a SRS resource set can be sent/transmitted in a BWP or CC. If the slot offset parameter is configured for each SRS resource, multiple SRS resources within one SRS resource set may have different slot offsets, an available slot may be replaced by a set of available slots which may include one or more slot offsets. In such case, a set of available slots may indicate a set of slots in which all SRS symbols of all SRS resources within a SRS resource set can be sent/transmitted in a BWP or CC.

In another example, RRC signaling (or other types of signaling) may be used to configure/determine the value of the slot offset to a value of 1. Therefore, the configured slot offset value can be interpreted as indicating that the second available/allowable slot, starting at/from the slot of the PDCCH 414 transmission, can be used to transmit the SRS 416. If the PDCCH 414 is transmitted by using slot 0 (or other DL slots), the second available slot may correspond to slot 4, for instance. Therefore, slot 4 may transmit/send/broadcast the SRS 416.

In some embodiments, the value of the slot offset can be interpreted/defined as indicating the first available slot after the $k^{th}$ slot from a PDCCH 414 transmission. For example, if the slot offset has a value of 2 and the PDCCH 414 is transmitted in slot n, the SRS 416 may be transmitted in the first available slot after/starting from slot n+2. In some embodiments, the SRS slot offset may be defined/interpreted as indicating the time offset between a PUSCH/PDSCH/DCI transmission (and/or other transmissions) and a SRS transmission. The time offset may correspond to a slot offset and/or a symbol offset. The SRS slot offsets can include negative values (e.g., the SRS transmission may precede the PUSCH transmission).

Additional interpretations/definitions of the value of the slot offset may be considered. However, approaches that intend to redefine the value of the slot offset may be unable to provide sufficient SRS flexibility (e.g., up to 2 bits of the DCI are used to indicate the SRS request field). In some embodiments, increasing/expanding the size of the SRS request field of the DCI may improve the SRS flexibility. Combining one or more approaches, such as increasing the size of the SRS request field and/or reinterpreting the value of the slot offset, may further enhance the SRS flexibility. However, combining one or more approaches can result in additional DCI overhead.

If the SRS slot offset (or other time offset) is redefined/reinterpreted, a PDCCH and/or other transmissions may be transmitted in a slot (e.g., to trigger/cause an aperiodic SRS transmission) without causing PDCCH congestion. However, the PDCCH transmission may cause other difficulties for simultaneous transmissions of one or more SRSs in one or more carriers and/or serving cells.

Figure 5:
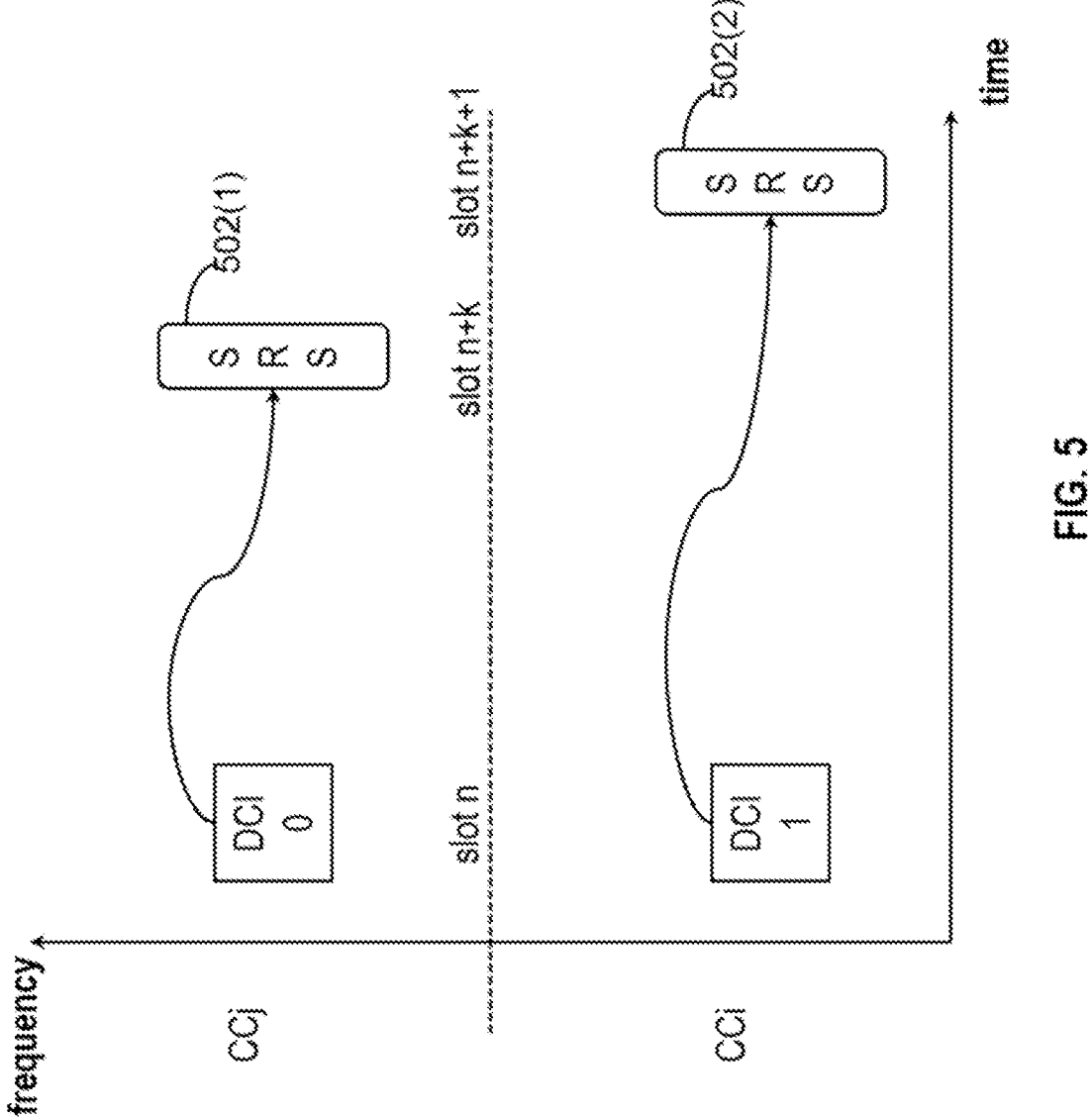
FIGS. 5-7 illustrate various approaches for using a downlink control information (DCI) to schedule a sounding reference signal (SRS) resource and/or SRS resource set, in accordance with some embodiments of the present disclosure.

Referring now to FIG. 5, depicted is an example approach 500 for using a DCI to schedule a SRS resource and/or SRS resource set. In some embodiments, a DCI (e.g., DCI0) in a component carrier (CC), for example CCj, in a slot (e.g., slot n) may schedule a first SRS resource and/or SRS resource set 502(1). RRC signaling and/or other types of signaling may configure/determine a value of a slot offset (e.g., slot offset k). Another DCI (e.g., DCI1) in another CC (e.g., CCi) in the slot (e.g., slot n) may schedule a second SRS resource and/or SRS resource set 502(2). The slot offset may correspond to a value associated with the configured slot offset value (e.g., k+1 slots). Therefore, the first SRS resource and/or SRS resource set 502(1) in the CC (e.g., CCj) may be transmitted in slot n+k (or other values). The second SRS resource and/or SRS resource set 502(2) in the corresponding CC (e.g., CCi) may be transmitted in slot n+k+1 (or other values).

Figure 6:
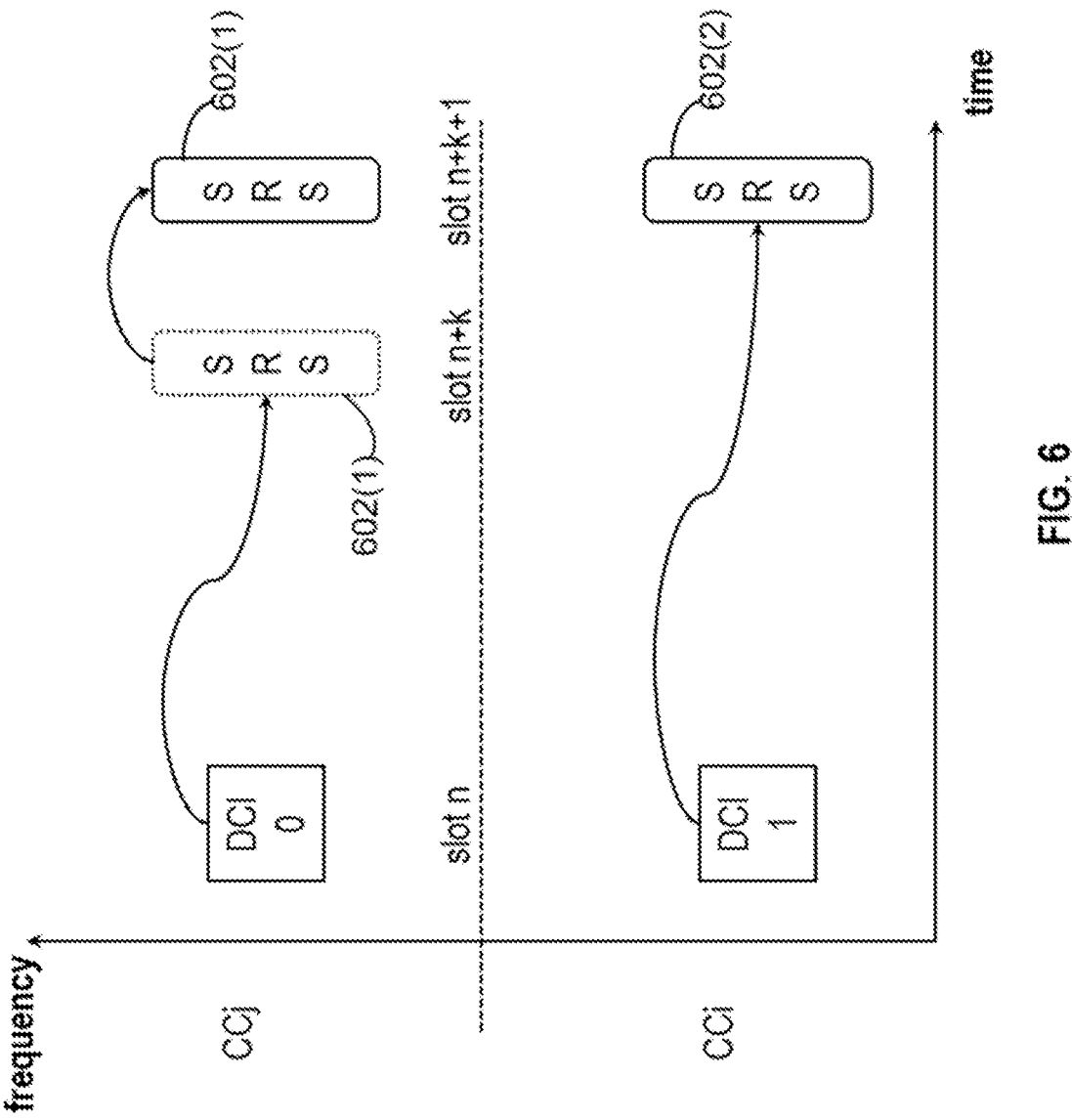

Referring now to FIG. 6, depicted is an example approach 600 for using a DCI to schedule a SRS resource and/or SRS resource set. In some embodiments, a DCI (e.g., DCI0) in a CC (e.g., CCj) in a slot (e.g., slot n) may schedule a first SRS resource and/or SRS resource set 602(1). Responsive to scheduling the first SRS transmission 602(1), an attempt to transmit/send/broadcast the first SRS resource and/or SRS resource set 602(1) using slot n+k (or other slots) may occur. However, slot n+k may be unavailable for a SRS transmission 602(1) in the corresponding CC (e.g., CCj). For instance, slot n+k in CCj does not include UL symbols. Therefore, the first SRS transmission 602(1) may be delayed/rescheduled/moved to a second slot (e.g., slot n+k+

1). The second slot (e.g., slot n+k+1) may be usable/available/allowed to transmit/send/broadcast the first SRS transmission 602(1).

In some embodiments, another DCI (e.g., DCI1) in another CC (e.g., CCi) may schedule a second SRS resource and/or SRS resource set 602(2) in slot n+k+1. Therefore, the first SRS transmission 602(1) and the second SRS transmission 602(2) may overlap/coincide/conflict in the time domain (e.g., the SRS transmissions are scheduled in the same slot n+k+1). However, the wireless communication device (e.g., UE) may be unable to support/enable/execute simultaneous SRS transmissions in the corresponding CCs (e.g., CCi and/or CCj). For example, the wireless communication device may be unable to provide support for at least two beams transmitting data simultaneously. However, the SRS transmissions (e.g., SRS in CCi and/or SRS in CCj) may utilize the at least two beams. In some embodiments, a beam may correspond to at least one of a quasi co-location (QCL)-TypeD, a spatial relation, and/or a spatial domain transmission filter. A wireless communication device (e.g., UE) may report its capability to a wireless communication node (e.g., base station). For example, a wireless communication device may report/specify/indicate whether it is able to support/enable/execute simultaneous SRS transmissions in the corresponding CCs.

In some embodiments, one or more SRS resources and/or SRS resource sets may be scheduled in the same time instance (e.g., slot) and/or the same orthogonal frequency division multiplexing (OFDM) symbol(s). In some embodiments, at least two SRS resources and/or SRS resource sets may overlap/collide/conflict in the time domain. The wireless communication device may fail to send/transmit/broadcast the SRS transmissions simultaneously. Therefore, the wireless communication device may prioritize/order the SRS resources and/or SRS resource sets (e.g., in one or more CCs) to execute/complete the transmissions. The SRS resources and/or resource sets may be of an aperiodic SRS type. In some embodiments, one or more options/approaches/methods to prioritize the SRS transmissions (e.g., the SRS resources and/or SRS resource sets) may exist.

Option 1: A first triggered SRS transmission (e.g., SRS resource and/or SRS resource set x1) in a first CC (e.g., CCi1) may be scheduled for transmission in a first slot (e.g., slot n1). A second triggered SRS transmission (e.g., SRS resource and/or SRS resource set x2) in a second CC (e.g., CCi2) may be scheduled for transmission in the same slot, overlapped time, or symbols (e.g., slot n1). In some embodiments, the second SRS transmission may be of higher priority/importance than the first SRS transmission. Therefore, the first SRS transmission may be deferred/delayed/moved/scheduled to the following available slot after the first slot (e.g., to avoid overlap/collision between the SRS transmissions). In some embodiments, the first CC and/or the second CC may be different CCs.

Option 2: A first triggered SRS transmission (e.g., SRS resource and/or SRS resource set x1) in a first CC (e.g., CCi1) may be scheduled for transmission in a first slot (e.g., slot n1). A second triggered SRS transmission (e.g., SRS resource and/or SRS resource set x2) in a second CC (e.g., CCi2) may be scheduled for transmission in the same slot, overlapped time, or symbols (e.g., slot n1). In some embodiments, the second SRS transmission may be of higher priority/importance than the first SRS transmission. Therefore, the first SRS transmission may be dropped/bypassed.

Option 3: A first triggered SRS transmission (e.g., SRS resource and/or SRS resource set x1) in a first CC (e.g., CCi1) may be scheduled for transmission in a first slot (e.g., slot n1). A second triggered SRS transmission (e.g., SRS resource and/or SRS resource set x2) in a second CC (e.g., CCi2) may be scheduled for transmission in the same slot, overlapped time, or symbols (e.g., slot n1). In some embodiments, the second SRS transmission may be of higher priority/importance than the first SRS transmission. Therefore, the symbol(s) of the first SRS transmission that overlap with the second SRS transmission may be dropped/bypassed/prevented from transmission.

In some embodiments, higher layer signaling (e.g., RRC signaling, MAC signaling, and/or other types of signaling) may configure/determine/establish at least one priority rule. In some embodiments, the priority rule may be predetermined/predefined. The wireless communication device may use the priority rule(s) to determine a course of action (e.g., option 1, option 2, option 3, and/or other options) when at least two SRS transmissions are overlapping/colliding in the time domain. One or more methods/approaches to prioritize the SRS transmissions (e.g., aperiodic SRS resources and/or SRS resource sets) in one or more CCs may include:

Method 1: Using one or more CC indices.

SRS transmissions in CCs with lower/smaller CC indices may be of less priority than SRS transmissions in CCs with higher CC indices.

SRS transmissions in CCs with higher/larger CC indices may be of higher priority than SRS transmissions in CCs with lower CC indices.

A primary cell (PCell) and/or a Spcell (Special Cell) may have the highest priority. The priority of the remaining CCs may be based on the CC indices.

Method 2: Based on the usage of the SRS.

For example, a SRS with codebook specific/related usage may be of higher priority than a SRS with antenna switching specific/related usage.

Method 3: Using higher level signaling (e.g., RRC signaling).

For example, higher layer signaling may inform/indicate/provide/specify at least one priority rule among CCs in which at least two SRS may not be transmitted simultaneously.

Method 4: Using a configuration and/or location of one or more PDCCH transmissions (or other transmissions) triggering SRS transmissions.

For example, a first PDCCH (e.g., an earlier PDCCH and/or other transmissions) may trigger/cause a first SRS. A second PDCCH (e.g., a latter PDCCH and/or other transmissions) may trigger a second SRS. The priority rule may indicate the first PDCCH has a higher priority than the second PDCCH.

Method 5: A CC with a PUSCH and/or physical uplink control channel (PUCCH) may have a higher (or lower) priority than a CC without a PUSCH and/or PUCCH.

Method 6: A SRS in a first CC scheduled by a PDCCH (or other channels) in a second CC may have lower/less priority. A SRS in a second CC scheduled by a PDCCH in the same CC may have higher priority.

Method 7: Using one or more CC indices where the CCs carry PDCCHs to trigger SRS transmissions.

Method 8: Using the value of a subcarrier spacing of a SRS transmission. For example, a SRS with large subcarrier spacing in a first CC may have lower priority than a SRS with small subcarrier spacing in a second CC.

Method 9: Combined method 1-8.

Figure 7:
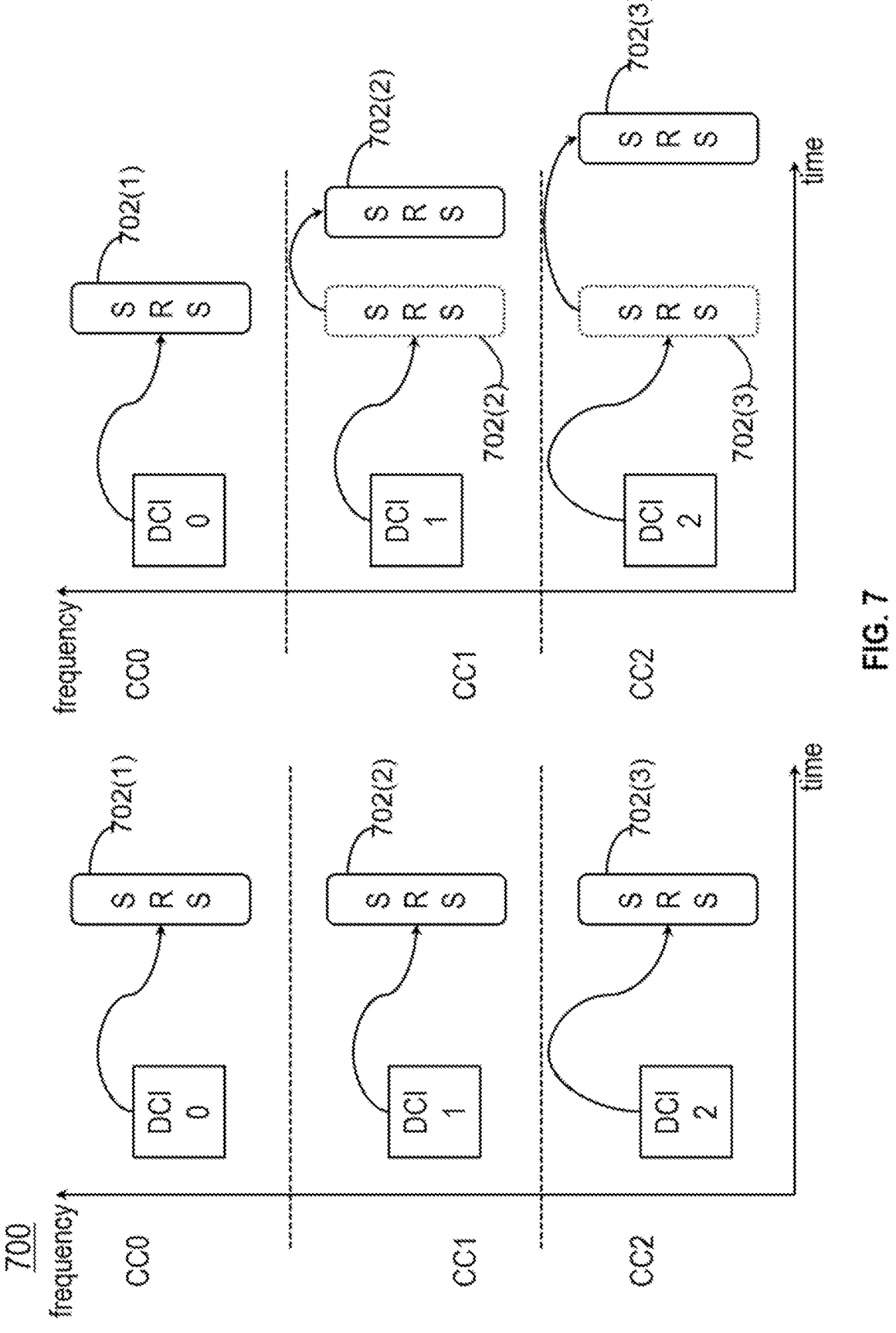

Referring now to FIG. 7, depicted is an example approach 700 for using a DCI and/or a CC index to schedule a SRS resource and/or SRS resource set. In some embodiments, one or more CC indices may be used to determine the priority of aperiodic SRS transmissions. For example, a SRS transmission (e.g., SRS 702(1) and/or SRS 702(4)) in a CC with a lower CC index (e.g., CC0) may have higher priority than a SRS transmission (e.g., SRS 702(3) and/or SRS 702(6)) in a CC with a higher CC index (e.g., CC2). In some embodiments, one or more SRS transmissions in one or more CCs may be triggered simultaneously. For example, SRS 702(1), SRS 702(2), and/or SRS 702(3) in CC0, CC1, and/or CC2 may be triggered in the same slot (e.g., simultaneously). However, the wireless communication device may fail to simultaneously transmit/send/broadcast the one or more triggered SRSs. Therefore, the SRS transmission 702(2) in CC1 may be delayed/changed/moved/rescheduled to a next available slot to avoid overlap/collision/conflict with SRS transmission 702(1) in CC0. A SRS transmission 702(3) in CC2 may be delayed/changed/moved/rescheduled to a next available slot, wherein the SRS transmissions in CC0 and/or CC1 are not transmitted in the next available slot.

In some embodiments, at least one priority rule may be used if the wireless communication device cannot (or lacks a capability to) simultaneously transmit/send one or more SRS transmissions in one or more CCs. If the wireless communication device is able to send/transmit the SRS transmissions simultaneously, the priority rule(s) may not be needed.

In some embodiments, the scheduling of a first SRS transmission 702(1) (e.g., SRS resource and/or SRS resource set) with a highest priority (e.g., compared to other SRS transmissions) may be unchanged responsive to a possible overlap/collision/conflict (e.g., with other SRS transmissions). A second SRS transmission 702(2) with a secondary priority (e.g., compared to the first SRS transmission) may be changed/moved/rescheduled to a next available slot responsive to a possible overlap/collision with the first SRS transmission 702(1) (or other transmissions with higher priority). In some embodiments, a third SRS transmission 702(3) with a low priority (e.g., compared to the first and/or second SRS transmission) may be changed/moved/rescheduled to a next available slot responsive to a possible overlap/collision with the first SRS transmission 702(1) and/or the second SRS transmission 702(2). The next available slot of the third SRS transmission 702(3) can be determined by using the location (e.g., slot number) of the first and/or second SRS transmissions 702(2). In some embodiments, other SRS transmissions may follow/use/implement the same priority rule. The wireless communication device may delay/change/reschedule a SRS resource and/or SRS resource set if the SRS resource and/or resource set overlaps/collides/conflicts with another SRS transmission with higher priority (e.g., based on the CC indices and/or SRS usage).

B. Embodiment 2

In some embodiments, a DCI specific to a wireless communication device (e.g., DCI format 0_1, DCI format 0_2, DCI format 1_1, and/or DCI format 1_2) in a CC (e.g., CCi) may be used to schedulet one PUSCH and/or PDSCH transmission (or other transmissions). The one PUSCH and/or PDSCH transmission may be scheduled in the same CC (e.g., CCi) and/or in another CC (e.g., CCj). The DCI in CCi may include/indicate/provide/specify a carrier indicator field (CIF) and/or other fields. One or more bits (e.g., 3 bits) of the DCI may be used to indicate/specify the CIF. The CIF (or other DCI fields) may indicate/specify a relative carrier index of a CC (e.g., CCj). The relative carrier index of the CC (e.g., CCj) may correspond to the serving cell identification (ID) of the CC. Therefore, the CIF can be used to indicate/specify the CC index of the CC (e.g., CCj).

Referring now to FIG. 8, depicted is an example approach 800 for mapping at least one CIF value with one or more CCs. In some embodiments, the CIF of the DCI can indicate/specify/inform in which CC (e.g., CC #i, CC #j1, and/or other CCs) the scheduled PUSCH/PDSCH (or other channels) is transmitted to the wireless communication device. For example, a DCI in CC #i may be used to schedule at least one PUSCH and/or PDSCH transmission (or other transmissions). If the CIF has a value of 0 (or other values), the DCI may schedule the PUSCH/PDSCH transmission(s) in the same CC (e.g., CC #i). In another example, if the CIF has a value of 2 (or other values), the DCI (e.g., in CC #i) may schedule the PUSCH/PDSCH transmission(s) in another CC (e.g., CCj #2). Therefore, the value of the CIF is associated/mapped/linked/related to at least one CC.

In some embodiments, at least one DCI may schedule at least one SRS transmission in one or more CCs. The at least one DCI may schedule one PUSCH and/or PDSCH transmissions in one of the one or more CCs. In some embodiments, a DCI can trigger/cause one or more SRS transmissions in one or more CCs. Each of the one or more CCs may correspond to at least one value of the CIF in the DCI. In other words, it should be ensure that one of these CCs corresponds to one CIF value in the DCI.

Referring now to FIG. 9 depicted is an example approach 900 for mapping at least one CIF value with one or more CC groups. In some embodiments, at least one CIF value can be mapped/associated/related to at least one CC group in which a SRS may be transmitted. A CC group may include one or more CCs. In some embodiments, different CIF values can map to different CC groups. For example, a CIF value of 0 can map to a CC group that includes CC #i and/or CC #j2. In the same example, a CIF value of 5 can map to a CC group that includes CC #j3 and/or CC #j5. For each CIF value, the mapped CC group for a SRS transmission may include the CC for the PUSCH transmission (or other transmissions). In some embodiments, a CC group that maps to a CIF value for a SRS transmission may include the CC mapping to the CIF for a PUSCH/PDSCH transmission. For example, a first CC group can map to a CIF value of 0 for a SRS transmission. The same CIF value (e.g., a value of 0) can map to the CC for a PUSCH/PDSCH transmission (e.g., CC #i). Therefore, the first CC group can include CC #i, wherein CC #i is the CC for the PUSCH/PDSCH transmission.

In some embodiments, a SRS request may be triggered by a DCI, for instance, DCI #i. The value of the CIF of DCI #i may specify/correspond to a first CC group, wherein the CC group includes one or more CCs (e.g., CC #j3, CC #j2, and/or other CCs). Therefore, one or more SRS resources and/or SRS resource sets in the CCs of the first CC group may be triggered, wherein the SRS resources and/or SRS resource sets link to the SRS trigger state value indicated by DCI #i. For example, the CIF of DCI #i (or other DCIs) may have a value of 1 (or other values). In the same example, the SRS request value of the same DCI (e.g., DCI #i) may have a value of 2 (or other values). Therefore, the DCI may trigger the SRS resources and/or SRS resource sets linking to a SRS trigger state value of 2 in CC #j1, CC #j3, and CC #j5.

C. Embodiment 2-1

Referring now to FIG. 10, depicted is an example approach 1000 for configuring at least one CIF value for a SRS resource and/or SRS resource set. In some embodiments, one or more CIF values may be configured/predetermined for each SRS resource and/or SRS resource set in a CC (e.g., CC #j). A DCI may indicate/provide/specify at least one of the configured/predetermined CIF values. The DCI may trigger/cause the SRS resource and/or SRS resource set. Therefore, a DCI may indicate/provide/specify the configured CIF value(s) and/or a value of the SRS request field. If the DCI specifies a configured CIF value(s) and/or the value of the SRS request field links to the SRS resource and/or SRS resource set, the SRS transmissions may be triggered. The configured CIF values may correspond to a list of CIF values for each SRS resource and/or SRS resource set. Therefore, a list of CIF values may be configured/predetermined for a SRS resource and/or SRS resource set in a CC. A DCI indicating at least one of the CIF values of the configured list of CIF values may trigger the SRS resource and/or SRS resource set.

For example, a SRS resource set m1 in CCj #3 may be linked/associated to SRS trigger state values $\{1, 2\}$ (or other values). The CIF values configured for resource set m1 may correspond to CIF values $\{1, 3\}$ (or other values). A DCI may indicate/provide/specify/include a SRS request field value of $\{1, 2\}$ and a CIF value of $\{1, 3\}$. Therefore, the DCI may trigger resource set m1 (or other resource sets with corresponding CIF and/or SRS request field values).

As shown in FIG. 10, one or more CIF values may be configured for each SRS resource set in a CC. In some embodiments, different CIF values may be configured for different SRS resource sets. For example, DCI #i (or other DCIs) may include/specify a CIF value of 2 or 4. Therefore, DCI #i may trigger SRS resource set 1 in CCj #2 (or other SRS resource sets). In another example, SRS resource set 1 in CC #j1 may be triggered by a DCI, wherein the DCI includes a CIF value of 1, 3, and/or 5.

In some embodiments, a PUSCH/PDSCH transmission (or other transmissions) in a first CC (e.g., CC #jx) may be triggered by a first DCI in a second CC (e.g., CC #i). The first DCI may indicate/provide/include a CIF value of x (or other values). Therefore, a CIF value of x may be used to trigger a SRS transmission in the first CC (e.g., CC #jx). In some embodiments, the CIF value of the first DCI (e.g., a CIF value of x) may be predetermined/predefined for a SRS resource and/or SRS resource set (e.g., use the same CIF value to trigger the PUSCH/PDSCH and/or SRS transmissions). Therefore, the CIF value of the first DCI may be configured without using higher layer signaling (e.g., RRC signaling).

D. Embodiment 2-2

In some embodiments, one or more lists of CIF values may be configured under a respective SRS configuration (SRS-Config). For example, one list of CIF values may be configured in SRS-Config. A DCI indicating at least one CIF value of the list of CIF values may trigger one or more SRS resources and/or SRS resource sets. In some embodiments, a first DCI may indicate at least one CIF value of the list of CIF values and the indicated SRS request field value linking to one or more SRS resources and/or SRS resource sets. Therefore, the first DCI may trigger the linked SRS resources and/or SRS resource sets. The SRS resources and/or SRS resource sets may be excluded from positioning and/or non-positioning purposes.

In some embodiments, two or more lists of CIF values may be configured under SRS-Config. Each list of CIF values may correspond to a group of SRS resources and/or SRS resource sets. For example, a first list of CIF values may be used for the SRS transmissions for positioning purposes, while a second list of CIF values can be used for the SRS transmissions for non-positioning purposes.

E. Embodiment 2-3

In some embodiments, one or more lists of CIF values and/or one or more scheduling serving cell indices may be configured for each SRS resource, SRS resource set, and/or SRS-Config. For example, a first list of CIF values may include the values $\{2, 3\}$, while a first list of scheduling cell indices may include the values $\{1, 4\}$. The first list of CIF values and/or the first list of scheduling cell indices may be configured for a SRS resource set m in a first CC (e.g., CC #j). Therefore, a DCI in CC1 and/or CC4 with a CIF value of 2 or 3 may trigger SRS resource set m.

In some embodiments, scheduling serving cells with different configurations may have different/separate/independent configured list(s) of CIF values. In some embodiments, different DCI formats (e.g., DCI format 0_1, DCI format 0_2, and/or other DCI formats) may have different/separate/independent configured list(s) of CIF values.

F. Embodiment 3

In some embodiments, the systems and methods presented in two or more of embodiments 1, 2, 2-1, 2-2 and 2-3 may be combined. For aperiodic SRS transmissions, SRS flexibility may increase/improve by redefining/reinterpreting the slot offset value k (or other time offsets). The slot offset value k may identify/specify/indicate the slot offset between a PDCCH (or other transmissions) and the $k^{th}$ and/or $(k+1)^{th}$ available slot for SRS transmissions. The slot offset value k may be configured and/or indicated to the wireless communication device. Responsive to obtaining the slot offset value k, the wireless communication device may transmit/send/broadcast one or more triggered SRS transmissions using the $k^{th}$ and/or $(k+1)^{th}$ available slot starting from/at the PDCCH transmission slot. In some embodiments, the slot offset value k may indicate/specify the first available slot after k slot(s) from the PDCCH transmissions. For example, if the slot offset value k has a value of 0, the first available slot may correspond to the slot in which the PDCCH is transmitted.

In some embodiments, the slot offset value k may indicate/specify/provide a slot offset value between a PUSCH/PDSCH transmission and a SRS transmission. The value of the slot offset may correspond to an absolute value. In some embodiments, the slot offset value k may indicate/provide the $k^{th}$ and/or $(k+1)^{th}$ available slot starting from, after, and/or before the PDSCH/PUSCH transmission. In some embodiments, the slot offset value k may indicate/provide the first available slot starting from, after, and/or before k slot(s) from the PDSCH/PUSCH transmissions. If k is a positive value (e.g., k is greater than 0), the slot offset value k may indicate/provide the first available slot starting after k slot(s) from the PDSCH/PUSCH transmissions. If k is a negative value (e.g., k is less than 0), the slot offset value k may indicate/provide the first available slot starting before k slot(s) from the PDSCH/PUSCH transmissions.

In some embodiments, an available slot may correspond to a slot in which one or more SRS symbols of a first SRS resource and/or SRS resource set in a first CC (e.g., CC #i) and/or bandwidth part (BWP) (e.g., BWP #i) are transmitted. The available slot may exclude the slot in which a second SRS resource and/or SRS resource set in a second CC (e.g., CC #j) and/or BWP (e.g., BWP #j) is transmitted. In some embodiments, the available slot may exclude the slot in which the second SRS resource and/or SRS resource set in the second CC (e.g., CC #j) and/or BWP (e.g., BWP #j) overlaps in time with the SRS transmission(s) in the first CC and/or BWP. The second SRS resource and/or SRS resource set in the second CC/BWP may have a higher priority than the first SRS resource and/or SRS resource set. The wireless communication device may fail to transmit the SRS resources and/or SRS resource sets simultaneously. Higher layer signaling may be used to configure the priority among SRS transmissions in one or more CCs (e.g., embodiment 1). In some embodiments, the priority among SRS transmissions in one or more CCs may be predetermined. The second SRS resource and/or SRS resource set may include at least one aperiodic SRS. In some embodiments, the second SRS resource and/or SRS resource set may include at least one semi-persistent and/or periodic SRS.

In some embodiments, an available slot may correspond to a slot in which one or more SRS symbols of a first SRS resource and/or SRS resource set in a first CC (e.g., CC #i) and/or a first BWP (e.g., BWP #i) are transmitted. The available slot may exclude the slot in which a semi-persistent and/or periodic SRS transmission (e.g., SRS resource and/or SRS resource set) in the same CC (e.g., CC #i) and/or BWP (e.g., BWP #i) is transmitted. In some embodiments, the available slot may exclude the slot in which a semi-persistent and/or periodic SRS transmission (e.g., SRS resource and/or SRS resource set) in the same CC (e.g., CC #i) and/or BWP (e.g., BWP #i) overlaps in time with the aperiodic SRS transmissions.

In some embodiments, an available slot may correspond to a slot in which one or more SRS symbols of a first SRS resource and/or SRS resource set in a first CC (e.g., CC #i) and/or a first BWP (e.g., BWP #i) are transmitted. The available slot may exclude the slot in which a semi-persistent and/or periodic SRS transmission (e.g., SRS resource and/or SRS resource set) in a second CC (e.g., CC #j) and/or BWP (e.g., BWP #j) is transmitted. In some embodiments, the available slot may exclude the slot in which a semi-persistent and/or periodic SRS transmission (e.g., SRS resource and/or SRS resource set) in the second CC (e.g., CC #j) and/or BWP (e.g., BWP #j) overlaps in time with the aperiodic SRS transmissions in the first CC and/or BWP. The wireless communication device may fail to transmit the SRS resources and/or SRS resource sets simultaneously. In some embodiments, the indices corresponding to the first and/or second CC/BWP (e.g., indices i and j) may be the same or different.

In some embodiments, the same DCI and/or PDCCH (or other transmissions) may trigger the aperiodic SRS transmissions in the first CC and/or the second CC (e.g., embodiments 2, 2-2, 2-2 and/or 2-3). In some embodiments, higher layer signaling may refer to signaling beyond the physical layer (e.g., MAC layer signaling, RRC signaling, and/or other types of signaling).

G. Embodiment 4

In some embodiments, a SRS transmission A in a first CC (e.g., CC #i) may be scheduled in an available slot based on a slot offset value. The available slot may exclude a SRS transmission B in a second CC (e.g., CC #j). The SRS transmission B may overlap/coincide/conflict in the time domain with the SRS transmission A. The CC indices (e.g., indices i and j) may correspond to non-negative integers.

In some embodiments, SRS transmission B may have a higher priority than SRS transmission A. In some embodiments, a wireless communication device may fail to transmit/send/broadcast SRS transmission A and SRS transmission B simultaneously. In some embodiments, the SRS transmission B may correspond to a semi-persistent and/or periodic SRS transmission.

In some embodiments, a wireless communication node (e.g., gNB) may configure/determine one or more lists of CIF values in a SRS configuration. The SRS transmissions may use the configured list(s) of CIF values and/or the value of the CIF field of a DCI. In some embodiments, one or more lists of CIF values may be configured per SRS resource, SRS resource set, and/or SRS-Config. If a CIF value indicated by a DCI corresponds to at least one CIF value of the list(s) of CIF values, an SRS resource set may be triggered. In some embodiments, a list of CIF values may be used for SRS transmissions for a positioning purpose. In some embodiments, a list of CIF values may be used for SRS transmissions for a non-positioning purpose.

H. Methods for Sounding Reference Signal (SRS) Indication Enhancement

Figure 11:
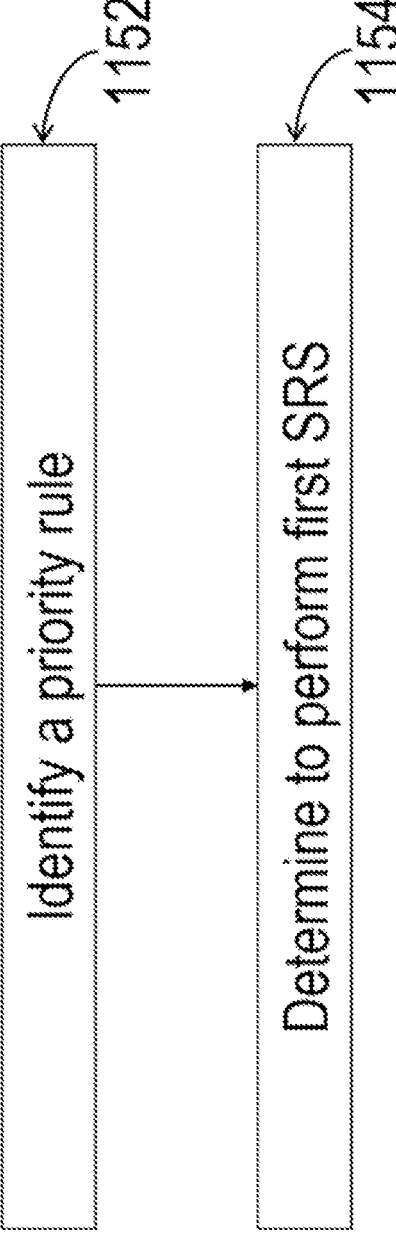
FIGS. 11-12 illustrate flow diagrams of example methods for SRS indication enhancement, in accordance with some embodiments of the present disclosure.

FIG. 11 illustrates a flow diagram of a method 1150 for SRS indication enhancement. The method 1150 may be implemented using any of the components and devices detailed herein in conjunction with FIGS. 1-10. In overview, the method 1150 may include identifying a priority rule (1152). The method 1150 may include determining to perform a first SRS (1154).

Referring now to operation (1152), and in some embodiments, a wireless communication device may identify a priority rule. For example, the wireless communication device may identify a priority rule, wherein the priority rule uses one or more CC indices to determine the priority/hierarchy of one or more SRS transmissions (e.g., SRS resources and/or SRS resource sets). Higher layer signaling (e.g., RRC signaling, MAC layer signaling, and/or other types of signaling) may be used to configure the priority rule. Higher layer signaling may include radio resource control (RRC) signaling or medium access control (MAC) layer signaling. In some embodiments, the priority rule may be predetermined/predefined. The wireless communication device may use the priority rule to prioritize/order a plurality of SRS transmissions in at least the first CC and/or the second CC. For example, the wireless communication device may use an identification of SRS usage to prioritize one or more transmissions in CC #i and/or CC #j. In some embodiments, the priority rule operates according to a CC index of at least one of the first CC or the second CC. For example, the CC index of the first CC may correspond to a value of 0 (or other values), while the CC index of the second CC may correspond to a value of 1 (or other values). In this example, the priority rule may specify/indicate that the priority of SRS transmissions may increase with decreasing CC index. Therefore, a SRS transmission in the first CC (e.g., CC index has a value of 0) may have a higher priority than a SRS transmission in the second CC (e.g., CC index has a value of 1). Responsive to identifying the priority rule, the wireless communication device may use the priority rule to determine to perform a SRS transmission.

Referring now to operation (1154), and in some embodiments, a wireless communication device (e.g., a UE) may determine to perform a first SRS transmission (e.g., SRS resource and/or SRS resource set) in a first CC (e.g., CC #i). For example, the wireless communication device may determine to perform a first SRS transmission in a first CC due to a lack of other higher priority SRS transmissions (e.g., in other CCs) that overlap/conflict/collide with the first SRS transmission. The wireless communication device may determine to perform the first SRS transmission in an available time unit (e.g., time slot) according to a time offset (e.g., slot offset value k) and/or a second SRS transmission in a second CC (e.g., CC #j). For example, the wireless communication device may determine to perform the first SRS transmission in the $k^{th}$ available slot after a PDCCH transmission (or other transmissions). In some embodiments, the second SRS transmission may have a higher priority than the first transmission. The wireless communication device may determine/identify the priority of one or more SRS transmission by using a priority rule. In some embodiments, the wireless communication device is incapable of simultaneously supporting the first SRS transmission and/or the second SRS transmission. In some embodiments, the second SRS transmission may correspond to an SRS transmission of semi-persistent and/or periodic type.

In some embodiments, the available time unit excludes an instance (e.g., a slot) where the second SRS transmission overlaps/conflicts/collides with the first SRS transmission in a same symbol. In some embodiments, the wireless communication device may determine to perform the first SRS transmission in a next available time unit (e.g., next available time slot). The wireless communication device may determine to perform the SRS transmission in a next available time unit if the first SRS transmission would overlap in time with the second SRS transmission if performed in the available time unit. For example, a first SRS transmission in a first CC may be scheduled for transmission in a first slot (e.g., slot n1). A second SRS transmission in a second CC may be scheduled for transmission in the same slot (e.g., slot n1). In some embodiments, the second SRS transmission may be of higher priority/importance than the first SRS transmission. Therefore, the wireless communication device may defer/delay/move the first SRS transmission to the following available slot after the first slot (e.g., to avoid overlap/collision between the SRS transmissions).

In some embodiments, the wireless communication device may determine to drop/bypass the first SRS transmission. The wireless communication device may determine to drop the SRS transmission if the first SRS transmission would overlap in time/symbol(s)/slot with the second SRS transmission if performed in the available time unit. For example, a first SRS transmission in a first CC may be scheduled for transmission in a first slot (e.g., slot n1). A second SRS transmission in a second CC may be scheduled for transmission in the same slot (e.g., slot n1). In some embodiments, the second SRS transmission may be of higher priority/importance than the first SRS transmission. Therefore, the first SRS transmission may be dropped/bypassed/prevented. In some embodiments, the wireless communication device may be incapable of simultaneously supporting the first SRS transmission and/or the second SRS transmission. In some embodiments, the wireless communication device may be incapable of simultaneously supporting two beams for the first SRS transmission and/or the second SRS transmission respectively.

Figure 12:
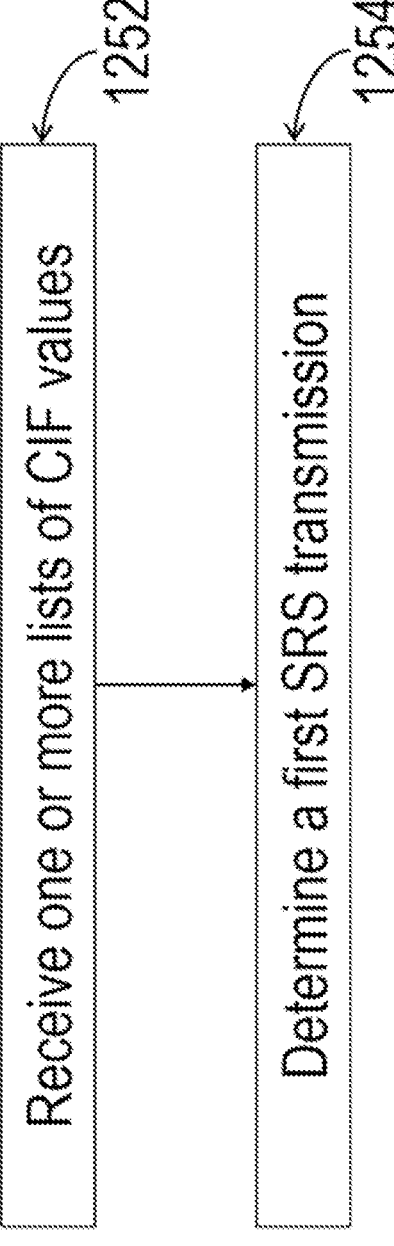

FIG. 12 illustrates a flow diagram of a method 1250 for SRS indication enhancement. The method 1250 may be implemented using any of the components and devices detailed herein in conjunction with FIGS. 1-10. In overview, the method 1250 may include receiving one or more lists of CIF values (1252). The method 1250 may include determining a first SRS transmission (1254).

Referring now to operation (1252), and in some embodiments, a wireless communication device (e.g., a UE) may receive/obtain one or more lists of CIF values. A wireless communication node may send/transmit/broadcast one or more lists of CIF values for SRS transmissions (e.g., SRS resources and/or SRS resource sets). The wireless communication device may receive/obtain the one or more lists of CIF values for SRS transmissions. In some embodiments, each of the one or more lists of CIF values may be configured/determined corresponding to a respective SRS resource and/or SRS resource set. In some embodiments, each of the one or more lists of CIF values may be configured/determined corresponding to a respective SRS-Config. The one or more lists of CIF values may include a first list of CIF values used for SRS transmissions for a positioning purpose. The one or more lists of CIF values may include a second list of CIF values used for SRS transmissions for a non-positioning purpose.

Referring now to operation (1254), and in some embodiments, the wireless communication device may determine a first SRS transmission. In some embodiments, the wireless communication node may cause the wireless communication device to determine the first SRS transmission. The wireless communication device may determine the first SRS transmission according to the one or more lists of CIF values. In some embodiments, the wireless communication device may determine the first SRS transmission according to a value of a CIF field in a DCI. If a CIF value indicated by the DCI matches/corresponds with one of the one or more lists of CIF values, the wireless communication device may transmit/send a first SRS resource and/or SRS resource set for the first SRS transmission.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
identifying, by a wireless communication device, a priority rule that is predetermined or is configured via higher layer signaling, to prioritize a plurality of sounding reference signal (SRS) transmissions in at least a first component carrier (CC) and a second CC, wherein the priority rule operates according to a CC index of at least one of the first CC or the second CC;
determining, by the wireless communication device, according to a time offset and a second SRS transmission in the second CC, to perform a first SRS transmission in a first CC in an available time unit, the second SRS transmission overlapping with the first SRS transmission in time domain, wherein the second SRS transmission has a higher priority than the first SRS transmission, and the wireless communication device is incapable of simultaneously supporting the first SRS transmission and the second SRS transmission; and
performing, by the wireless communication device, the first SRS transmission in the first CC in the available time unit.

2. The method of claim 1, wherein the second SRS transmission is of semi-persistent or periodic type.

3. The method of claim 1, wherein the higher layer signaling comprises radio resource control (RRC) signaling or medium access control (MAC) layer signaling.

4. The method of claim 1, wherein the available time unit excludes an instance where the second SRS transmission overlaps with the first SRS transmission in a same symbol.

5. The method of claim 1, comprising:
determining, by the wireless communication device, to perform the first SRS transmission in a next available time unit, if the first SRS transmission would overlap in time with the second SRS transmission if performed in the available time unit.

6. The method of claim 1, comprising:

determining, by the wireless communication device, to drop or bypass the first SRS transmission, if the first SRS transmission would overlap in time with the second SRS transmission if performed in the available time unit.

7. The method of claim 1, wherein the wireless communication device is incapable of simultaneously supporting two beams for the first SRS transmission and the second SRS transmission respectively.

8. A method comprising:

receiving, by a wireless communication device from a wireless communication node, one or more lists of carrier indicator (CIF) values for sounding reference signal (SRS) transmissions, the one or more lists of CIF values including a first list of CIF values that is used for SRS transmissions for a positioning purpose, and a second list of CIF values that is used for SRS transmissions for a non-positioning purpose;

determining, by the wireless communication device, a first SRS transmission according to the one or more lists of CIF values, and according to a value of a CIF field in a downlink control information (DCI); and performing, by the wireless communication device, the first SRS transmission in a first component carrier (CC) mapped to the value of the CIF field.

9. The method of claim 8, wherein each of the one or more lists of CIF values is configured corresponding to a respective SRS resource or resource set, or a respective SRS configuration (SRS-Config).

10. The method of claim 8, comprising:

transmitting, by the wireless communication device, using a first SRS resource or resource set for the first SRS transmission, when a CIF value indicated by the DCI matches with one of the one or more lists of CIF values.

11. A method comprising:

sending, by a wireless communication node to a wireless communication device, one or more lists of carrier indicator (CIF) values for sounding reference signal (SRS) transmissions, the one or more lists of CIF values including a first list of CIF values that is used for SRS transmissions for a positioning purpose, and a second list of CIF values that is used for SRS transmissions for a non-positioning purpose; and causing the wireless communication device to determine a first SRS transmission according to the one or more lists of CIF values, and according to a value of a CIF field in a downlink control information (DCI), and to perform the first SRS transmission in a first component carrier (CC) mapped to the value of the CIF field.

12. The method of claim 11, wherein each of the one or more lists of CIF values is configured corresponding to a respective SRS resource or resource set, or a respective SRS configuration (SRS-Config).

13. The method of claim 11, wherein the wireless communication device uses a first SRS resource or resource set for the first SRS transmission, when a CIF value indicated by the DCI matches with one of the one or more lists of CIF values.

14. A wireless communication device comprising:

at least one processor configured to:

identify a priority rule that is predetermined or is configured via higher layer signaling, to prioritize a plurality of sounding reference signal (SRS) transmissions in at least a first component carrier (CC) and a second CC, wherein the priority rule operates according to a CC index of at least one of the first CC or the second CC;

determine, according to a time offset and a second SRS transmission in the second CC, to perform a first SRS transmission in the first CC in an available time unit, the second SRS transmission overlapping the first SRS transmission in time domain, wherein the second SRS transmission has a higher priority than the first SRS transmission, and the wireless communication device is incapable of simultaneously supporting the first SRS transmission and the second SRS transmission; and perform the first SRS transmission in the first CC in the available time unit.

15. The wireless communication device of claim 14, wherein the second SRS transmission is of semi-persistent or periodic type.

16. The wireless communication device of claim 14, wherein the higher layer signaling comprises radio resource control (RRC) signaling or medium access control (MAC) layer signaling.

17. The wireless communication device of claim 14, wherein the available time unit excludes an instance where the second SRS transmission overlaps with the first SRS transmission in a same symbol.

18. The wireless communication device of claim 14, wherein the at least one processor is configured to:

determine to perform the first SRS transmission in a next available time unit, if the first SRS transmission would overlap in time with the second SRS transmission if performed in the available time unit.

19. The wireless communication device of claim 14, wherein the at least one processor is configured to:

determine to drop or bypass the first SRS transmission, if the first SRS transmission would overlap in time with the second SRS transmission if performed in the available time unit.

20. The wireless communication device of claim 14, wherein the wireless communication device is incapable of simultaneously supporting two beams for the first SRS transmission and the second SRS transmission respectively.

\* \* \* \* \*